June 18, 1957 R. ATTKINS 2,796,450
MELTING OF HIGH MELTING POINT METALS OR ALLOYS
Filed June 11, 1954 5 Sheets-Sheet 1

INVENTOR:
Roy Attkins,
BY Cushman, Darby & Cushman
ATTORNEYS.

June 18, 1957 R. ATTKINS 2,796,450
MELTING OF HIGH MELTING POINT METALS OR ALLOYS
Filed June 11, 1954 5 Sheets-Sheet 4

INVENTOR:

Roy Attkins,
BY Cushman, Darby - Cushman
ATTORNEYS

June 18, 1957 R. ATTKINS 2,796,450
MELTING OF HIGH MELTING POINT METALS OR ALLOYS
Filed June 11, 1954 5 Sheets-Sheet 5

INVENTOR:
Roy Attkins,
BY Cushman, Darby & Cushman
ATTORNEYS.

United States Patent Office 2,796,450
Patented June 18, 1957

2,796,450

MELTING OF HIGH MELTING POINT METALS OR ALLOYS

Roy Attkins, Yardley, Birmingham, England, assignor to Imperial Chemical Industries Limited, a corporation of Great Britain Application June 11, 1954, Serial No. 436,209

Claims priority, application Great Britain June 12, 1953

6 Claims. (Cl. 13—9)

This invention relates to improved apparatus for use in the arc-melting of high melting point reactive metals and alloys, such for example as titanium, zirconium, molybdenum, thorium, hafnium, tantalum, chromium and their alloys.

In one method available for the arc-melting of such metals and alloys the raw material, for example in the form of sponge or powder, is continuously or batch melted in a cooled crucible, the heat required for melting being provided by an arc struck between the surface of the metal and a second electrode, which is cooled and tipped with a material such as graphite or tungsten which is not rapidly consumed during working, above the said surface. This method has certain disadvantages, for example the difficulty of effecting uniform introduction of the raw material into the crucible, the possibility of unmelted raw material inclusions particularly in ingots of large cross-section, and in particular electrode tip wear and its corollary, contamination of the melt by electrode material, e. g. carbon or tungsten. In a second method the metal to be melted is fed to the crucible in the form of a consumable electrode which is melted progressively by the heat of the arc to form an ingot in the crucible, with or without an additional feed of raw material in for example sponge or powder form into the crucible. The main advantage to be gained from using a consumable electrode is that contamination of the melt by the electrode material is eliminated. Secondary advantages are that the melting efficiency is increased since no energy is lost in direct cooling of the electrode, that less pure and finer grades of raw material can be melted since splashing of the molten pool is less damaging, and that alternating current can be employed, reducing the capital cost of the electrical equipment. The consumable electrode can be formed from the material to be melted in various ways, for example by compacting, but however it is formed it is necessary to feed it into the furnace at a controllable and variable rate and to lead the heavy arc current into the moving electrode with the minimum loss in electrical power. In order to effect the latter, it is essential to exert a very high pressure across the contacts or to use a contact surface of large true area. It has hitherto been customary in arc furnaces in which the electrodes are progressively melted, evaporated or oxidised away, to connect the electrode to the power supply by means of a single contact of relatively small area which is clamped tightly to the electrode. This moves with the electrode and after a time it is necessary to break the arc, unclamp the contact, move it to a new part of the electrode and re-strike the arc.

It is the chief object of the present invention to provide a stationary contact assembly which will feed current into the moving electrode continuously so that there is no need for periodic breaking of the arc.

According to the present invention we provide improved apparatus for the continuous introduction of a consumable electrode formed from a high melting point reactive metal or alloy or constituents thereof into an arc-melting furnace and for the supply of electrical current to the said electrode which comprises an arrangement of feed rolls and a contact system consisting of a plurality of individually spring-loaded contact brushes arranged in one or more groups, the spring tension of which is adjustable singly or together.

Control and variation of speed of the electrode feed is effected by variation of the speed of the feed rolls, which may be manually or power operated and are preferably spring- or weight-loaded. The electrode can be withdrawn by means of these rolls if desired. Preferably the roll assembly is mounted on a rotatable base in order that it may readily accommodate itself to slight surface or cross-sectional non-uniformities in the electrode.

The use of a large number of individually spring-loaded brushes provides a contact surface of large area, which cannot be obtained by employing a single large brush since the true contact area would be small at the relatively light contact pressure permissible when relative movement of electrode and contact is required.

The invention is illustrated but not limited by the accompanying drawings in which.

Figure 3:
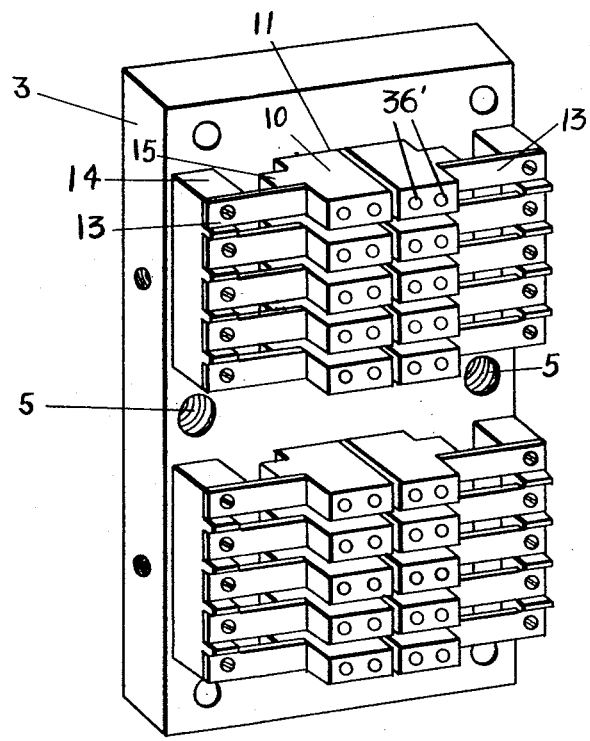
Figure 3 is a perspective view of the contact-carrying plate.

Referring to the drawings, the contact assembly consists of a rectangular casing 1 carrying four guide rods 2 on which the two contact carrying plates 3, 4 are slidably mounted. Each plate is provided with two threaded apertures 5, the opposing apertures on the two plates engaging worm gears 6 on coupled shafts 7 journalled in the casing 1. Meshing gear wheels 8, 9 on the shafts enable simultaneous rotation and the thread direction on the worm gears is arranged so that the plates 3 and 4 may be caused either to approach or recede from each other for the purpose hereinafter explained. Four sets of copper brushes 10, each set consisting of five brushes, are associated with each plate, which is provided with an upper and a lower set of five elongated apertures 11. A pair of brushes float in each aperture in side by side relationship (see Fig. 3) with their tips 12 (see Fig. 1) projecting through the plate, and each brush is restrained and retained in position in the plate by means of a flat spring member 13 secured to the shoulder 14 and abutting against a projection 15 on the brush.

The electrode feed assembly consists of a pair of flanged feed rolls 16, 17 mounted in a housing comprising a pair of arms 18 centrally pivoted between a pair of supports 19 secured to a circular base plate 20, which in turn is rotatably mounted on the top of the casing 1 with a ball race 21. The purpose of rotatably mounting the plate 20 is so that the roll assembly may readily accommodate itself to slight surface or cross-sectional nonuniformities in the electrode. Meshed gears 22 and 23 on the feed roll shafts are driven through a shaft and gear 24 mounted between extensions 25 of the arms 18.

Figure 1:
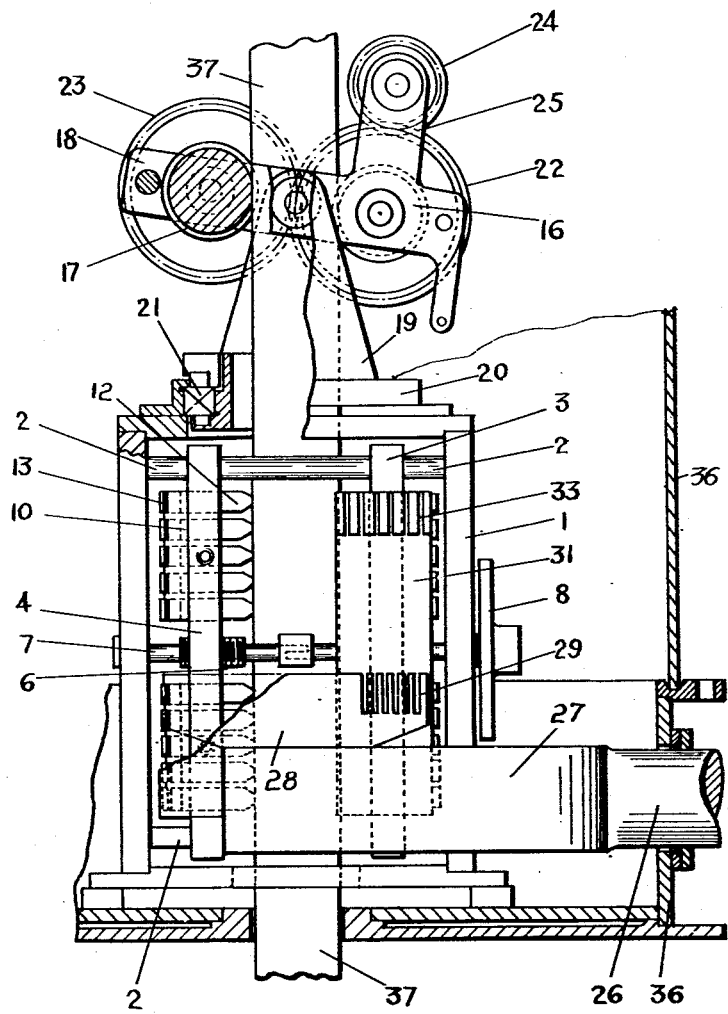
Figure 1 represents a side elevation, part section, of a combined feed and contact assembly in accordance with the invention.
Figure 2:
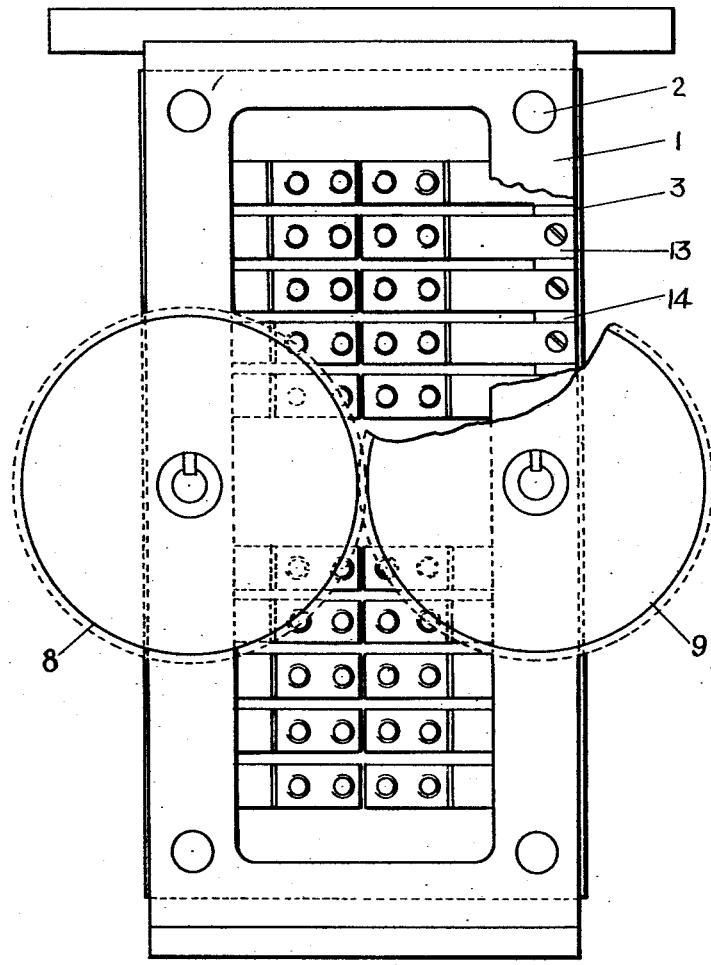
Figure 2 represents an end elevation of the contact assembly, not showing the connection to the power supply.
Figure 4:
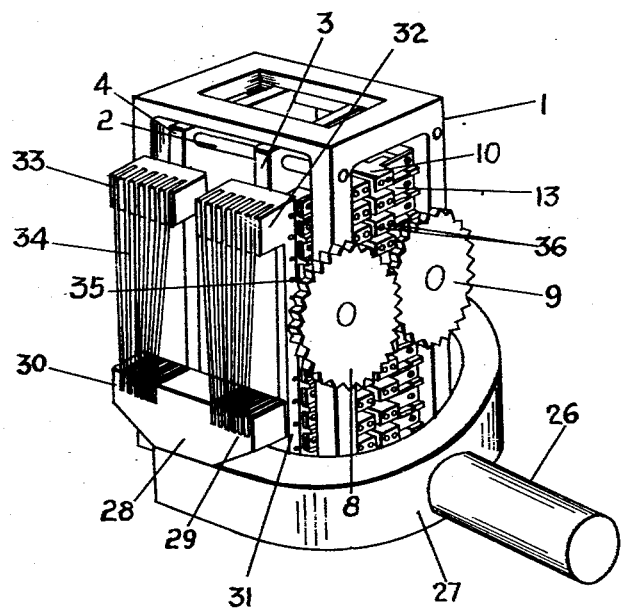
Figure 4 is a diagrammtaic perspective view of the contact assembly and power connection.

The arrangement of the electrical supply connection to the contact assembly is shown in Figures 1 and 4. The busbar 26 has a yoke 27 enclosing three sides of the contact housing, and on each end of the yoke is mounted a machined copper block 28 provided with two series of slots 29, 30. An L-shaped copper block 31 is screwed on to each side of the plates 3 and 4, the flange 32 being provided with a number of slots 33 corresponding to one set in the block 28. Braids 34 lead from each slot in the block to the corresponding slot in the flanges 32 and in this manner a flexible connection is provided which allows for movement of the plates 3 and 4 towards or away from each other. Finally, electrical connection is made to each individual brush by means of braids (not shown) leading from holes 35 tapped in one side of the blocks 31 to recesses 36' in the corresponding brush.

The complete assembly is enclosed within a gas-tight container of which a partial showing including the lower section 36 appears in Figure 1. The container is fitted on to the lid of the arc-melting furnace and the electrode feed can then be operated under an argon or other suitable inert atmosphere.

The consumable electrode is preferably of square cross-section and built up from preformed blocks of the required cross-section. These blocks are compacted from the raw material in sponge, powder or other form by a pressing, extrusion or other suitable operation. The blocks are supplied continuously to a station above the feed assembly and there joined together by an automatic welding machine (not shown in the drawing) to form a continuous electrode at a rate corresponding to the rate of consumption of the electrode in the furnace.

In operation, the consumable electrode 37 is fed in between the feed rolls operated by suitable driving means through the gear 24. The rotatable mounting of the feed roll assembly on the contact housing permits the rolls to conform to any disalignment occurring during the securing together of the segments of the electrode. The electrode then passes between the sets of brushes 10 on the plates 3 and 4, each individual brush being maintained in contact with the electrode as the result of its spring loading by the spring 13. If the mean contact pressure is found to be too great or too small, it can then be adjusted by rotation of the wheel 8 or 9 to effect movement of the plates 3 and 4 away from or towards each other and thus adjust the spring tension.

Figure 5:
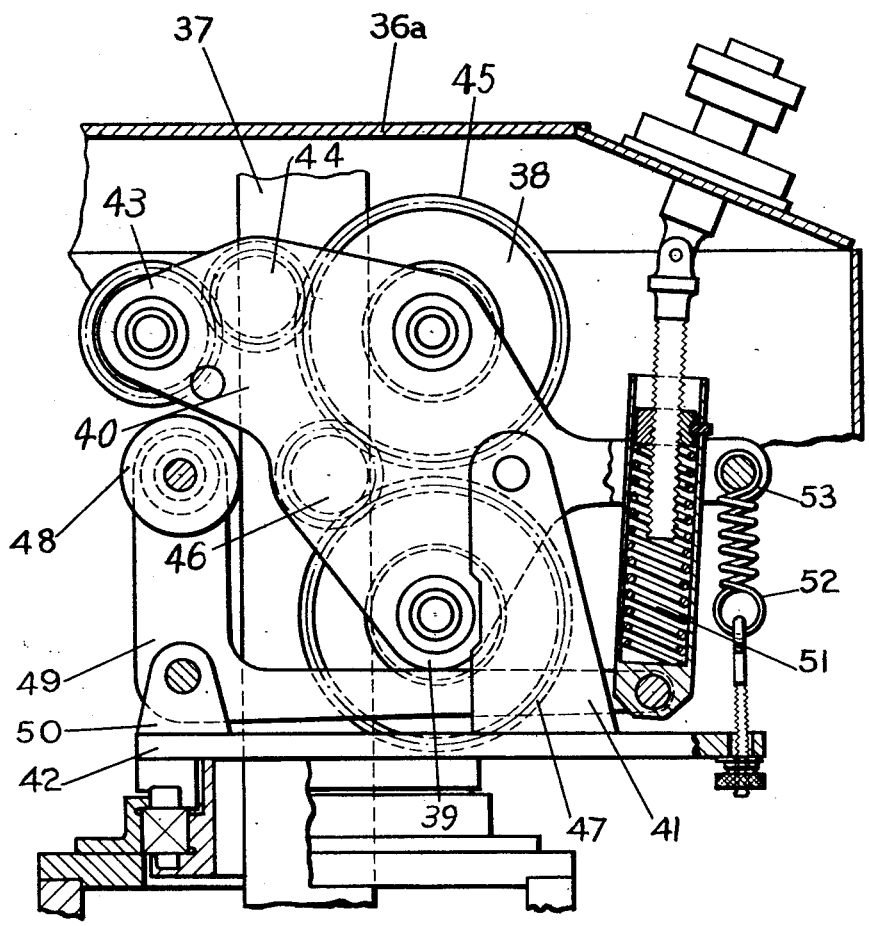
Figure 5 is a side elevation, part section, of an alternative feed roll assembly.

In the alternative form of electrode feed assembly shown in Figure 5 three feed rolls are employed instead of two. Two flanged feed rolls 38, 39 are mounted one above the other in a housing comprising a pair of side plates 40 pivoted between a pair of supports 41 secured to a base plate 42, which in turn is rotatably mounted on the top of the casing 1 in similar manner to that shown in Figure 1. These rolls are driven by means of a drive pinion 43 through an idler pinion 44, roll pinion 45 mounted on the shaft of the roll 38, an idler pinion 46, and roll pinion 47 mounted on the shaft of the roll 39. A pressure roll 48 mounted on a bell crank lever 49 pivoted between a pair of supports 50 secured to the base plate makes contact with the opposite side of the electrode 37, the contact pressure being adjustable by means of a compression spring adjusting device 51 pivoted to the other end of the lever 49 and controlled from outside the gas-tight container 36a through a universal coupling. The drive roll assembly is counter-balanced by an adjustable tension spring 52 fitted between the extensions 53 of the side plates 40 and the base plate. Independent mounting of the feed rolls on opposite sides of the electrode as employed in this construction has the advantages of facilitating initial entry of the electrode at the start of a run and conforming to any irregularities in the electrode surface.

I claim:

1. Apparatus for the continuous introduction of a consumable electrode formed from a high melting point reactive metal or alloy or the constituents thereof into an arc-melting furnace and for the supply of electrical current to the said electrode, which comprises; an arrangement of feed rolls for feeding engagement with the electrode, and a contact system consisting of a plurality of individually spring-loaded contact brushes arranged in a group for contacting said electrode to establish an electrical connection thereto, and means for simultaneously adjusting the spring tension of the brushes in said group.

2. Apparatus in accordance with claim 1, in which said group of contact brushes are freely supported in spaced relationship in an apertured plate with one end of said brushes adapted to contact the consumable electrode in its passage through the apparatus and the other end restrained against motion in a direction away from the electrode by means of spring members secured to the said plate, the tension of said spring members being adjustable by controlled movement of the plate relative to the position of the consumable electrode.

3. Apparatus in accordance with claim 2, in which the contact brushes are carried by a plurality of plates movement of which to adjust the tension of the spring members is effected by means of a single control device.

4. Apparatus in accordance with claim 1, in which the feed roll assembly is mounted on a rotatable base.

5. Apparatus in accordance with claim 1, in which the feed rolls and contact system are enclosed within a gas-tight container secured to the arc-melting furnace cover.

6. Apparatus in accordance with claim 1 in which opposing feed rolls are independently mounted, means operatively connected to said rolls whereby the pressure of said rolls against opposite sides of said electrode is independently adjustable.

References Cited in the file of this patent
UNITED STATES PATENTS

| | | |
|---|---|---|
| 655,808 | Stowe | Aug. 14, 1900 |
| 1,992,859 | Cooper | Feb. 26, 1935 |
| 2,019,971 | Hopkins | Nov. 5, 1935 |
| 2,250,219 | Chapman | July 22, 1941 |
| 2,272,738 | Chapman | Feb. 10, 1942 |
| 2,640,860 | Herres | June 2, 1953 |
| 2,662,104 | Southern | Dec. 8, 1953 |